US006212260B1

United States Patent
Baum et al.

(10) Patent No.: US 6,212,260 B1
(45) Date of Patent: Apr. 3, 2001

(54) EMERGENCY CALL SYSTEM (75) Inventors: Elliot Baum, Dix Hills; Gilbert I. Starr, New Rochelle, both of NY (US)

(73) Assignee: Elliot Baum, Dix Hills, NY (US)

( * ) Notice: Subject to any disclaimer, the term of this patent is extended or adjusted under 35 U.S.C. 154(b) by 0 days.

(21) Appl. No.: 09/282,378

(22) Filed: Mar. 31, 1999

(51) Int. Cl.[7] .................................................. H04M 11/00

(52) U.S. Cl. .................................. 379/38; 379/40; 379/41

(58) Field of Search ................................. 379/38, 39, 40, 379/41, 42, 43, 44, 45, 51

(56) References Cited

FOREIGN PATENT DOCUMENTS

2467814A * 5/1981 (FR) .

OTHER PUBLICATIONS

Johnson; An Emergency Call Unit; WO 92/14333, Aug. 10, 1992.*
Park; Electronic Mail Notification and access, WO 98/53624, Nov. 26, 1998.*

* cited by examiner

Primary Examiner—Huyen Le
Assistant Examiner—Melur Ramakrishnaiah
(74) Attorney, Agent, or Firm—Frishauf, Holtz, Goodman, Langer & Chick, P.C.

(57) ABSTRACT

An emergency call system includes an emergency call unit having a memory for storing a plurality of telephone numbers to be called and an emergency message, a record/call switch for connecting the emergency call unit to a telephone line, and for switching between a record mode in which the plurality of telephone numbers to be called and the emergency message can be recorded and stored in the memory, and a call mode in which the telephone numbers can be dialed in sequence and the emergency message supplied over the telephone line to the dialed telephone numbers to automatically advise of an emergency, a keypad including at least one emergency key, a plurality of numeric keys for keying in the telephone numbers to be called and a plurality of recording keys, a microprocessor controlling storage of the telephone numbers to be called and the emergency message in the memory, reading out the telephone numbers in sequence from the memory upon activation of at least one emergency key, then dialing the telephone numbers in sequence, and then supplying the emergency message over the telephone line to the dialed telephone numbers to automatically advise of an emergency; a receiver connected with the microprocessor; and a remote call unit having at least one emergency key and a transmitter for transmitting a signal to the microprocessor through the receiver when at least one emergency key on the remote call unit is activated.

19 Claims, 10 Drawing Sheets

EMERGENCY CALL SYSTEM

BACKGROUND OF THE INVENTION

The present invention relates generally to emergency call systems, and in particular, to an emergency call system for aiding persons in distress, for example, due to medical, fire, burglary or other emergencies.

Emergency call systems are known in which a person in distress can get immediate help. Specifically, in such systems, the person presses a button on a pendant which transmits a signal to an alarm in the person's house. The alarm then sends a signal to a central station, and a person at the central station must then dial the telephone numbers from a prescribed list in order to obtain aid for the distressed person.

However, such an arrangement is relatively complicated and costly. Specifically, such arrangement operates in a similar manner to a central burglar or fire alarm in a house, and requires a separate, complicated wiring assembly for the house, at a considerable cost. Also, such a system requires that a central station be provided, and therefore, the subscriber to such a system must pay a monthly fee for such service, adding further to the cost of the system.

Also, a problem with known systems is that if a central station, upon calling a telephone number for aid, continuously receives a busy signal, the central station may stop calling after a number of attempts, so that the person in distress does not receive aid.

SUMMARY OF THE INVENTION

Accordingly, it is an object of the present invention to provide an emergency call system that overcomes the aforementioned problems with the prior art.

It is another object of the present invention to provide an emergency call system that eliminates the requirement for a central station.

It is still another object of the present invention to provide an emergency call system that eliminates the requirement for a separate wiring of the person's house.

It is yet another object of the present invention to provide an emergency call system that can be used with a conventional telephone line.

It is still yet another object of the present invention to provide an emergency call system that will continuously call predetermined telephone numbers until an acknowledgement is received.

It is a further object of the present invention to provide an emergency call system that is inexpensive and easy to make, install and operate.

In accordance with an aspect of the present invention, an emergency call system by which a caller can automatically call a plurality of other parties to leave an emergency message, comprises an emergency call unit including a memory for storing a plurality of telephone numbers to be called and at least one emergency message, an input/output device for connecting the emergency call unit to a telephone line, at least one emergency key, and a microprocessor connected with the memory, the at least one emergency key and the input/output device for controlling storage of the plurality of telephone numbers to be called and the at least one emergency message in the memory, reading out the telephone numbers in sequence from the memory upon activation of at least one the emergency key, then dialing the telephone numbers in sequence, and then supplying the at least one emergency message over the telephone line to the dialed telephone numbers to automatically advise of an emergency.

A plurality of numeric keys are provided for keying in the plurality of telephone numbers to be called. The emergency call unit can include a telephone incorporated therein. Alternatively, the input/output device is capable of connecting a telephone unit thereto, and the numeric keys are provided on the telephone unit.

Also, a plurality of recording keys are connected with the microprocessor for controlling the microprocessor to store the plurality of telephone numbers to be called and the at least one emergency message. The plurality of recording keys includes a record key for controlling the microprocessor to start recording an emergency message, a play key for controlling the microprocessor to playback a recorded message, and a store key for controlling the microprocessor to store a telephone number to be called. Also, a 911 key can be included for setting 911 as a further number to be dialed in the event of an emergency.

The input/output device also includes a record/call switch connected with the microprocessor for switching between a record mode in which the plurality of telephone numbers to be called and the at least one emergency message can be recorded and stored in the memory, and a call mode in which the telephone numbers can be read out in sequence from the memory and dialed, with the at least one emergency message being supplied over the telephone line to the dialed telephone numbers to automatically advise of an emergency. A decode device is also connected with the microprocessor for decoding keys activated by a called party, and an encode device is connected with the microprocessor for encoding keys activated by the caller.

Also, a speaker and a microphone are provided through which a called party can communicate to the caller.

In a preferred embodiment, the emergency call unit includes a receiver connected with the microprocessor, and further comprises a remote call unit having at least one emergency key and a transmitter for transmitting a signal to the microprocessor through the receiver when the at least one emergency key on the remote call unit is activated.

In accordance with another aspect of the present invention, a method of alerting other parties of an emergency, includes the steps of activating an emergency key by a caller on one of an emergency call unit and a remote device; automatically dialing a first of a plurality of telephone numbers stored in the emergency call unit, in sequence, upon activation of the emergency key; automatically sending an emergency message to each dialed telephone number; and repeating the steps of automatically dialing and automatically sending after each emergency message has been sent to the respective dialed telephone number, for all of the plurality of telephone numbers in sequence.

Further, the emergency message is sent, regardless of whether there is an answer at each dialed telephone number.

The called party can also disable the emergency call unit to prevent further telephone numbers from being dialed, communicate with the caller, and replay the emergency message, by depressing respective preset keys on a keypad of a telephone of the called party.

The above and other objects, features and advantages of the present invention will become readily apparent from the following detailed description thereof which is to be read in connection with the accompanying drawings.

BRIEF DESCRIPTION OF THE DRAWINGS

FIGS. 4A–4G-2 are flow chart diagrams of the operation of the emergency call system.

DETAILED DESCRIPTION

Before discussing the present invention with reference to the drawings, a brief overview of the invention will be provided. With the present invention, when a user is in distress or has an emergency, the user depresses a key or button on an emergency call unit or on a pendant that the user is wearing, with the button that is depressed corresponding to the situation. For example, if the user has a medical emergency, the user may depress a key E1 on the pendant. The pendant then transmits a signal to the emergency call unit connected to a telephone line at the location of the user. The emergency call unit proceeds to dial, in sequence, a plurality of, for example, five, preset telephone numbers that are stored in a memory in the emergency call unit, with an optional sixth telephone number being 911. The unit plays a pre-recorded message regardless of whether the called telephone number is answered or not, and then proceeds to call the next telephone number. In addition, the person being called has the option of communicating with the caller, replaying the message or stopping further delivery of the message to subsequent telephone numbers by pressing appropriate keys on the called person's telephone keypad.

Thus, rather than requiring a complicated alarm unit which is hard-wired into the user's house and rather than requiring the use of a central station, the present invention automatically dials preset telephone numbers and delivers an emergency message for help. In the event that nobody is available at any of the called telephone numbers to respond, the unit can then be set to dial the emergency telephone number 911. Alternatively, the emergency telephone number 911 can be dialed at a different time in the sequence, such as the first, second, third or so on number that is dialed.

Figure 1:
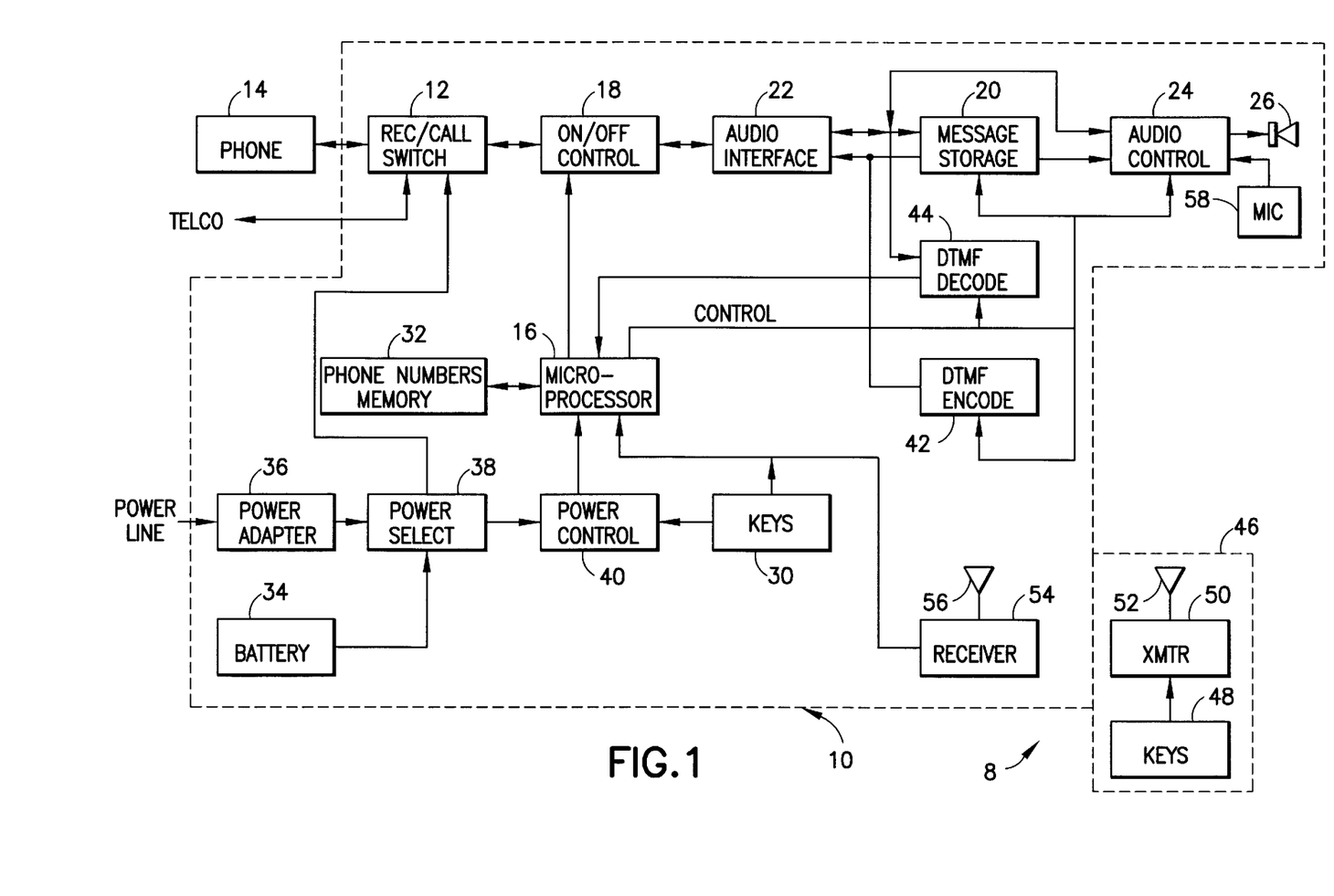
FIG. 1 is a block diagram of the emergency call system according to the present invention.

Referring now to the drawings in detail, an emergency call system 8 according to the present invention includes an emergency call unit 10 having a record/call switch 12 which connects to the telephone line of the telephone company (TELCO) through a conventional telephone jack, and to which an external telephone unit 14 can be connected through a conventional telephone line. Alternatively, telephone unit 14 can be formed integrally within emergency call unit 10. Record/call switch 12 is controlled to switch between a conventional telephone/emergency call use (CALL MODE) via telephone unit 14 in which telephone unit 14 can be operated normally and in which emergency call unit 10 automatically dials various preset telephone numbers during an emergency in order to supply a prerecorded message, and a RECORD MODE in which various telephone numbers and messages can be recorded and whereby telephone unit 14 is disabled.

The switching of record/call switch 12 is controlled by a REC/CALL key on the keypad. ON/OFF control circuit 18 is effectively a power transistor which creates an off hook condition of telephone unit 14, responsive to a signal from microprocessor 16.

A message storage unit 20 is provided for storing recorded messages and for supplying respective stored messages to the telephone line through an audio interface 22, ON/OFF control circuit 18 and record/call switch 12. In response to activation by a user, microprocessor 16 sends a control signal to message storage unit 20 to cause message storage unit 20 to supply a pre-recorded message to the telephone line when an emergency telephone number is dialed, as will be explained in greater detail hereinafter. Alternatively, a user can play back a recorded message to check the same, and this is also controlled by microprocessor 16 which causes message storage unit 20 to supply the recorded message to an audio control circuit 24, which selects whether the audio message or a DTMF signal is supplied to the speaker, and then supplies the analog signal to a loudspeaker 26 built into emergency call unit 10.

Figure 2:
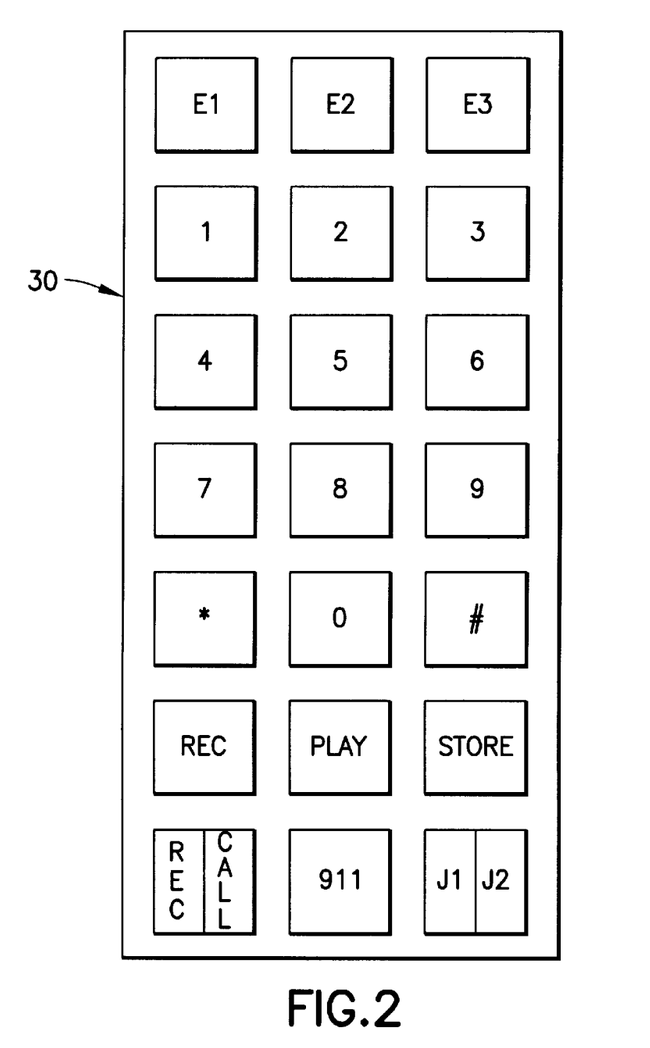
FIG. 2 is a top plan view of a keypad that can be used with the emergency call unit having a telephone incorporated integrally therein.

The upper surface of the housing for emergency call unit 10 contains a keypad 30 with a plurality of keys or buttons, as shown in FIG. 2. Specifically, there is at least one emergency key. In FIG. 2, three emergency keys are shown, namely, key E1 for a medical emergency, key E2 for a fire emergency and key E3 for a burglary emergency. However, the number of keys may vary within the scope of the present invention. Alternatively, one key can be provided which toggles through the different emergency situations, along with a separate send key (not shown) for sending a message corresponding to that key. In such case, as each key is toggled, a message can be played to indicate the particular key.

In addition, there is a record key REC for recording a message to be stored in message storage unit 20, a playback key PLAY for playing back a pre-recorded message storage in message storage unit 20, a store key STORE for storing telephone numbers and a key 911 for keying in an automatic emergency number 911. There is also a REC/CALL toggle key for controlling operation in a RECORD mode or a CALL mode. Keypad 30 is connected with microprocessor 16 for supplying appropriate signals thereto, as will be described hereinafter.

The numeric keys 0–9 and the star (*) key and pound (#) key of telephone unit 14 can be used to enter the appropriate digits and other commands where telephone unit 14 is a separate unit from emergency call unit 10. Alternatively, telephone unit 14 can be formed integrally with emergency call unit 10, and in such case, numeric keys 0–9 and the star (*) key and pound (#) key are formed on keypad 30 of emergency call unit 10, as shown in FIG. 2.

A telephone number memory 32 is also connected with microprocessor 16 and stores a plurality of, for example, up to five telephone numbers, although the number of telephone numbers that can be stored can vary within the scope of the present invention. Alternatively, telephone number member 32 and message storage unit 20 can be combined in a single memory. Reference in the claims to a memory for storing the telephone numbers and emergency messages refers to either a single memory or separate memories.

Power can be supplied to emergency call unit 10 by a battery 34 or a power line via a conventional power adapter 36. The outputs of battery 34 and power adapter 36 are supplied to a power select circuit 38 that selects power adapter 36 as a default, and which selects battery 34 when there is no power from the output of power adapter 36. The output of power select 38 is supplied to a power control circuit 40 that supplies power to microprocessor 16. In addition, power from power select 38 is supplied to record/call switch 12.

When an appropriate key E1, E2 or E3 from keys 30 is depressed, microprocessor starts reading out the telephone numbers one by one from memory 32 and supplying the same to a DTMF encode circuit 42 which then supplies an appropriate DTMF encoded signal for that telephone number to the telephone line through audio interface 22, ON/OFF control 18 and record/call switch 12. At the same time, microprocessor 16 controls message storage unit 20 to read out the appropriate pre-recorded message, which is also supplied to the telephone line through audio interface 22, ON/OFF control 18 and record/call switch 12. In a preferred mode of operation, the pre-recorded message is read out even while the telephone being dialed is still ringing. When a person picks up, the pre-recorded message may be in the middle of a message, although the called person has the option to replay the message. Preferably, the pre-recorded message is played once for each telephone number, so that the person picking up the telephone merely needs to continue listening to hear the message. In this manner, there is no delay from the time that the person answers the telephone. However, it is also possible for the message to be played twice once a telephone is picked up or after an answering machine answers. The advantage of the former method is that there is no need for any detection circuit in emergency control unit 10 to detect when a telephone is answered, thereby greatly simplifying the circuitry and rendering system 8 less costly. The called person also has the option of hitting a key to replay the message. In this regard, a jumper toggle key J1/J2 is provided. When depressed to the J1 side, only one message is played, and when depressed to the J2 side, the message is played twice.

As discussed above, when emergency call unit 10 dials out a telephone number from the telephone numbers stored in memory 32, and a person picks up the telephone, the pre-recorded emergency message is played. At such time, the called person can merely listen to the message and then take appropriate action. Alternatively, the called person can request a playback of the message by pressing a predesignated key, such as the "9" key on the person's telephone keypad. The person can also end the playback of the pre-recorded message and send a signal to emergency call unit 10 to prevent further telephone numbers being dialed, for example, by pressing a predesignated key, such as the "8" key on the person's telephone keypad. Also, the called person can set up a communication with the caller through speaker 26 and a microphone 58 connected with audio control circuit 24, by depressing a predesignated key, such as the "7" key. In such case, the tone for the number 7, 8 or 9 is supplied over the telephone line and through record/call switch 12, ON/OFF control circuit 18 and audio interface 22 to a DTMF decode circuit 44 which decodes the signal and supplies a signal corresponding thereto to microprocessor 16. If the "7" key has been depressed, communication is established between the parties. If the "8" key has been depressed, microprocessor 16 stops the dialing of further telephone numbers. If the "9" key has been depressed, microprocessor 16 controls memory storage to replay the pre-recorded message.

Figure 3:
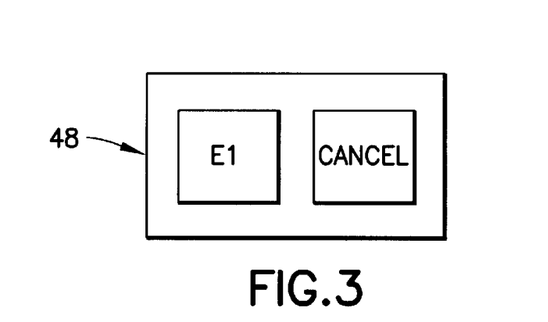
FIG. 3 is a top plan view of a keypad that can be used with the pendant.

Although the present invention has been discussed with reference to the depression of any of keys E1, E2 or E3 on keypad 30, the emergency call system 8 of the present invention can be activated from a location remote from emergency call unit 10. For example, emergency call system 8 can include a pendant 46 or other remote unit worn by the user and having one or a plurality of keys 48. For example, since the only time that a caller may need the pendant is during a medical emergency, only key E1 is preferably provided thereon, as shown in FIG. 3. Alternatively, all three keys E1, E2 or E3 can be provided. In addition, pendant 46 includes a cancel key CANCEL in the event that key E1 is inadvertently depressed, as shown in FIG. 3. Pendant 46 includes a transmitter 50 with an antenna 52 which transmits a signal corresponding to the depressed key 48 to a receiver 54 of emergency call unit 10, having an antenna 56. Receiver 54 supplies the received signal directly to microprocessor 16 in order to start the above emergency call operation.

Figure 4A:
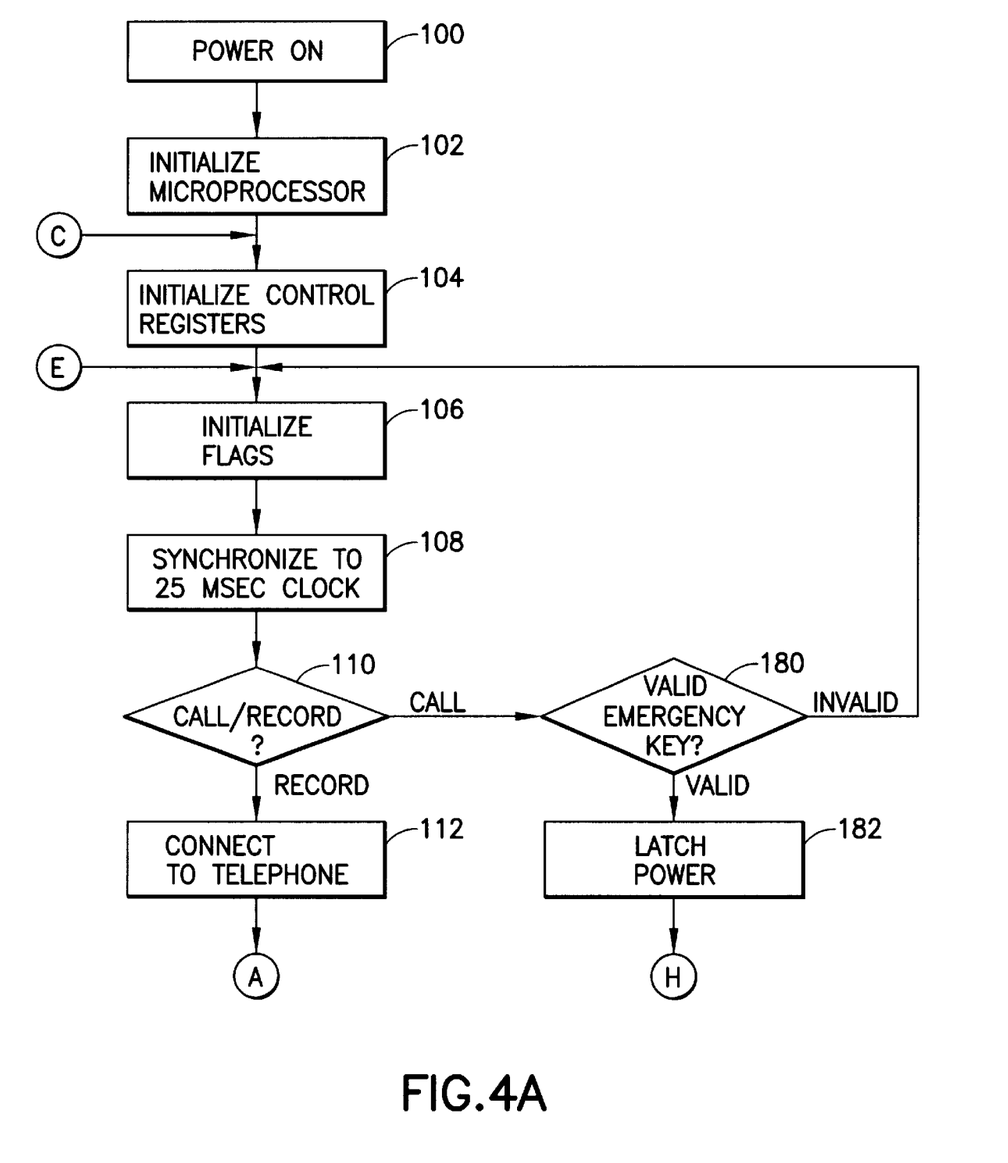

Referring now to the flow chart diagram which continues across FIGS. 4A–4G, and initially to FIG. 4A, it is assumed that power for emergency call unit 10 is turned on and record/call switch 12 is in the CALL position or RECORD position.

In step 100, in the call position when one of the emergency keys E1, E2 or E3 is depressed, and in the record position, by the key REC/CALL on the keypad being placed into the RECORD division, power is turned on for a RECORD MODE or CALL MODE, whereupon microprocessor 16 is initialized in step 102, followed by initialization of control registers of microprocessor 16 in step 104, that is, the input/output (I/O) of microprocessor 16, and then initialization of flags in the software stored in memory in microprocessor 16 in step 106. Thereafter, microprocessor 16 is synchronized with a 25 msec clock signal in step 108. Microprocessor 16 then determines if the CALL/REC key is in the CALL position or in the RECORD position. In the CALL position, the user can use telephone unit 14 in a conventional manner, and in addition, if one of the emergency keys E1, E2 or E3 is depressed, microprocessor 16 will operate in the CALL MODE. In the RECORD position, telephone unit 14 is disabled from the telephone line, and if one of the keys REC, PLAY, STORE or 911 is depressed, microprocessor 16 will operate in the RECORD MODE, as will be explained hereinafter.

The RECORD MODE will first be described. If the CALL/REC key is placed in the RECORD position, a message can be recorded or played back, telephone numbers can be stored or deleted, and a 911 telephone number can be enabled or disabled. In this mode, emergency call unit 10 is connected with telephone unit 14 to enable use of numeric keys 0–9 on telephone unit 14 for recording purposes, in step 112, in the event that telephone unit 14 is a separate unit.

Figure 4B:
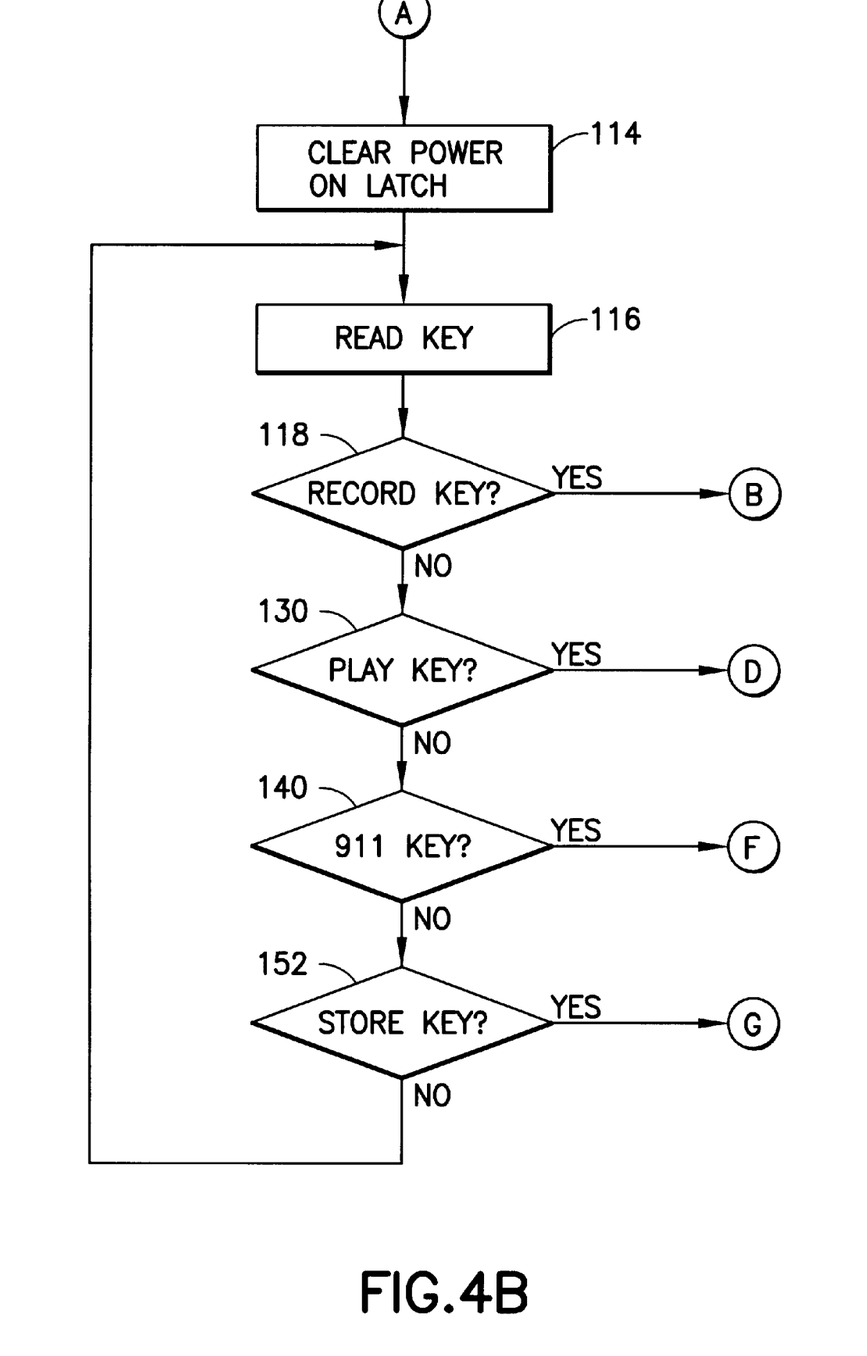

Referring now to FIG. 4B, power to the latch circuit of microprocessor 16 is then cleared in step 114, followed by reading of one of the keys REC, PLAY, STORE and 911 upon depression of the same, in step 116. In step 118, it is determined if the key that has been depressed is the record key REC for recording a message to be stored in message storage unit 20. If yes, the process continues to step 120 in FIG. 4C for the sub-process of recording a message to be sent during an emergency.

Figure 4C:
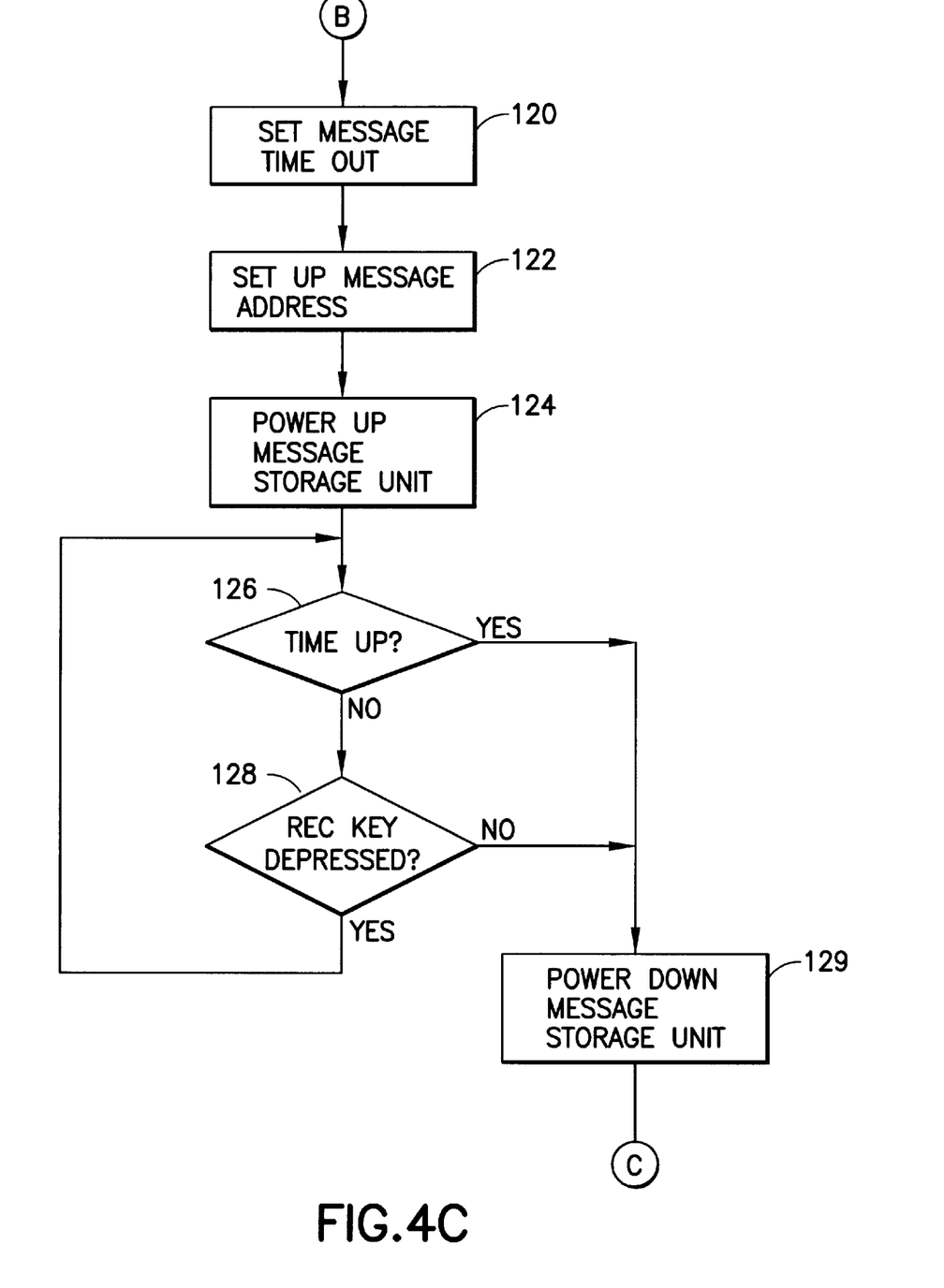
Figure 4D:
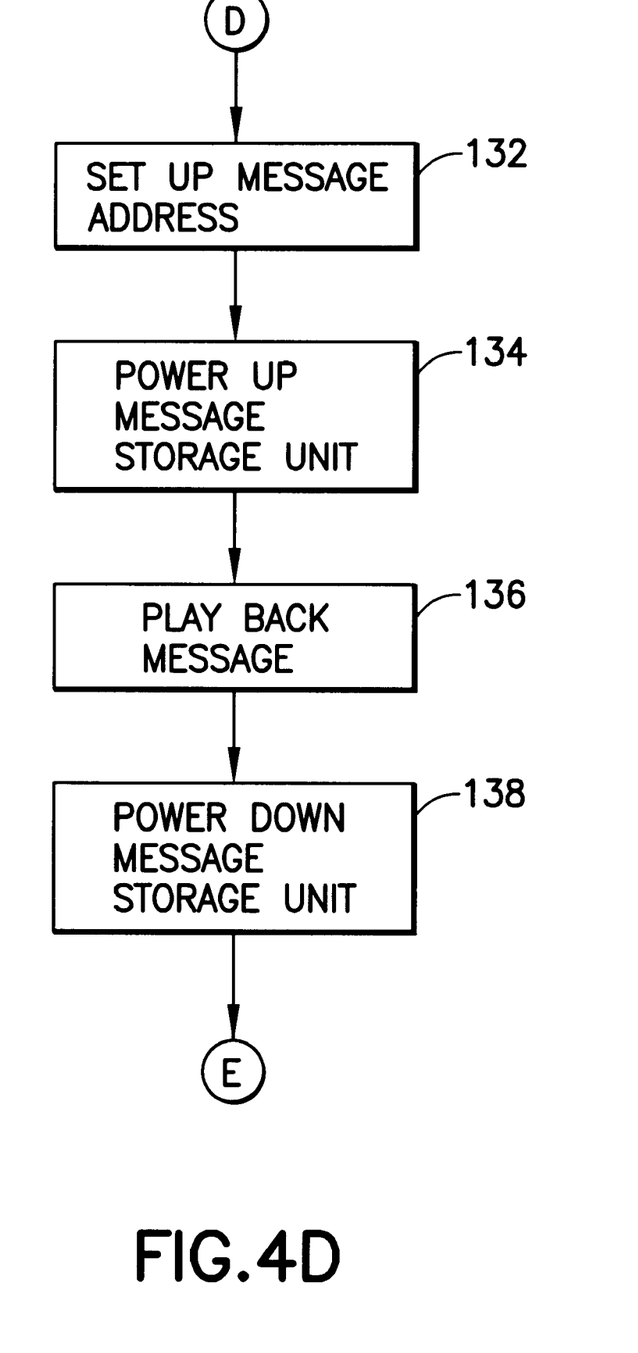
Figure 4E:
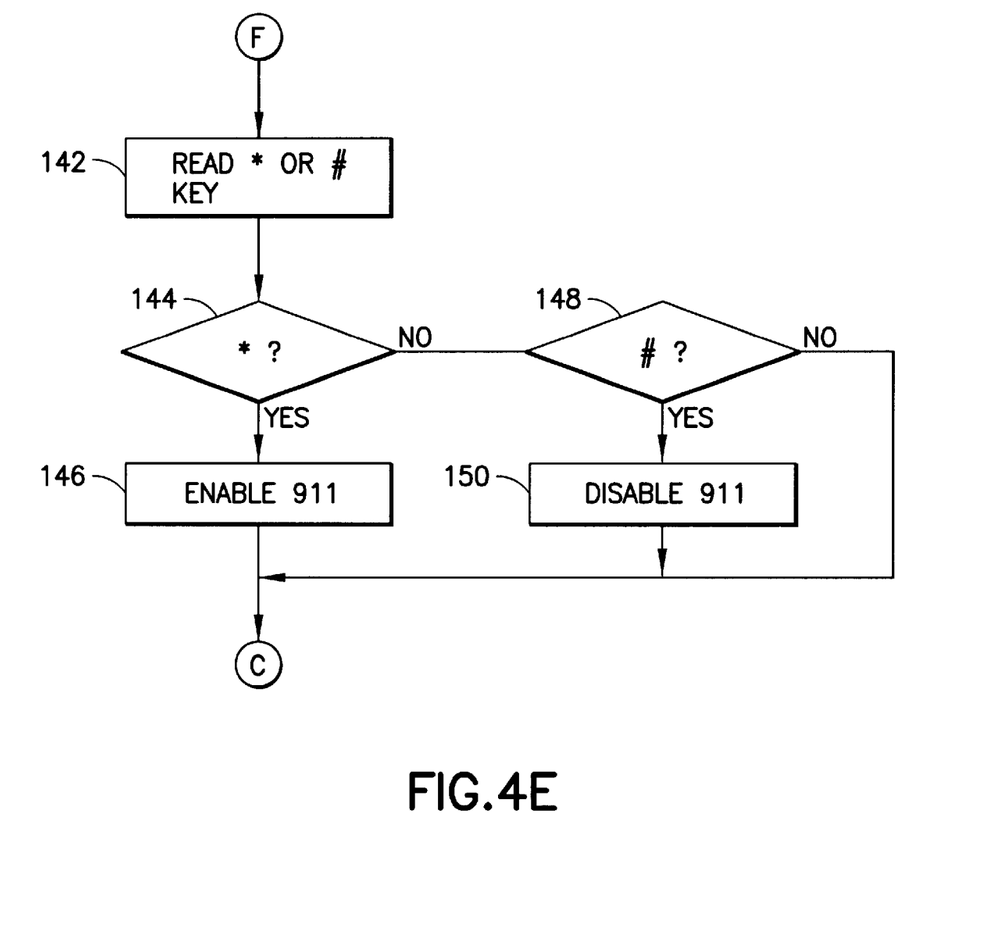

In step 120, a predetermined message time out is set in, microprocessor 16, that is, a maximum length of the message to be recorded. Then, in step 122, the message address is set in message storage unit 20 where the message to be recorded will be stored. This will depend upon which key E1, E2 or E3 was initially depressed. In other words, a first address is used for a message corresponding to key E1, a second address for a message corresponding to key E2 and a third address for a message corresponding to key E3. Thereafter, in step 124, power is supplied to message storage unit 20 in order to begin storing the message. While record key REC is maintained in a depressed condition, the user records the message. In step 126, it is determined if the message time out has been reached. If yes, the recording process is stopped, message storage unit 20 is powered down in step 129 and the process returns to the input of step 104 of FIG. 4A. If not, in step 128, it is determined if the record key REC is still held down. If record key REC is released, the recording operation is completed and the process returns to step 104 after powering down message storage unit 20 in step 129. If the record key REC is still held down, the process returns to the input of step 126 to continue recording the message. This loop continues until there is either a time out in step 126 or the record key REC is released in step 128.

Returning to FIG. 4B, if it is determined that the record key RECORD is not depressed in step 118, the process continues to step 130 where it is determined if the playback key PLAY has been depressed. If yes, the process continues to step 132 in FIG. 4D. Specifically, in step 132, the message address corresponding to the emergency key E1, E2 or E3 that has been depressed, is set up in microprocessor 16. Thereafter, in step 134, power is supplied to message storage unit 20, and then in step 136, there is playback of the stored message from message storage unit 20 corresponding to the emergency key E1, E2 or E3 that has been depressed. After the message has been played back, message storage unit 20 is powered down in step 138. The process then returns to step 106 in FIG. 4A.

Returning to FIG. 4B, if it is determined that the playback key PLAY is not depressed in step 130, the process continues to step 140 where it is determined if the key 911 has been depressed. If yes, the user will then depress the star (*) key on telephone unit 14 or the pound (#) key on telephone unit 14 to enable or disable 911 as a telephone number to be called in the event of an emergency. Specifically, microprocessor 16 will read the star (*) or pound (#) key depressed on local telephone 14 in step 142 in FIG. 4E. It is next determined if the star (*) key has been depressed in step 144. If yes, 911 is enabled as a telephone number to be called in the event of an emergency in step 146, and the process returns to step 104 in FIG. 4A. If no, it is next determined if the pound (#) key has been depressed in step 148. If yes, 911 is disabled as a telephone number to be called in the event of an emergency in step 150, and the process returns to step 104 in FIG. 4A. If no, the process returns to step 104 in FIG. 4A.

Returning to FIG. 4B, if it is determined that the key 911 is not depressed in step 140, the process continues to step 152 where it is determined if the store key STORE has been depressed, in order to store telephone numbers to be dialed in the event of an emergency. If no, the process returns to step 116 where the above processes are repeated.

Figure 4F:
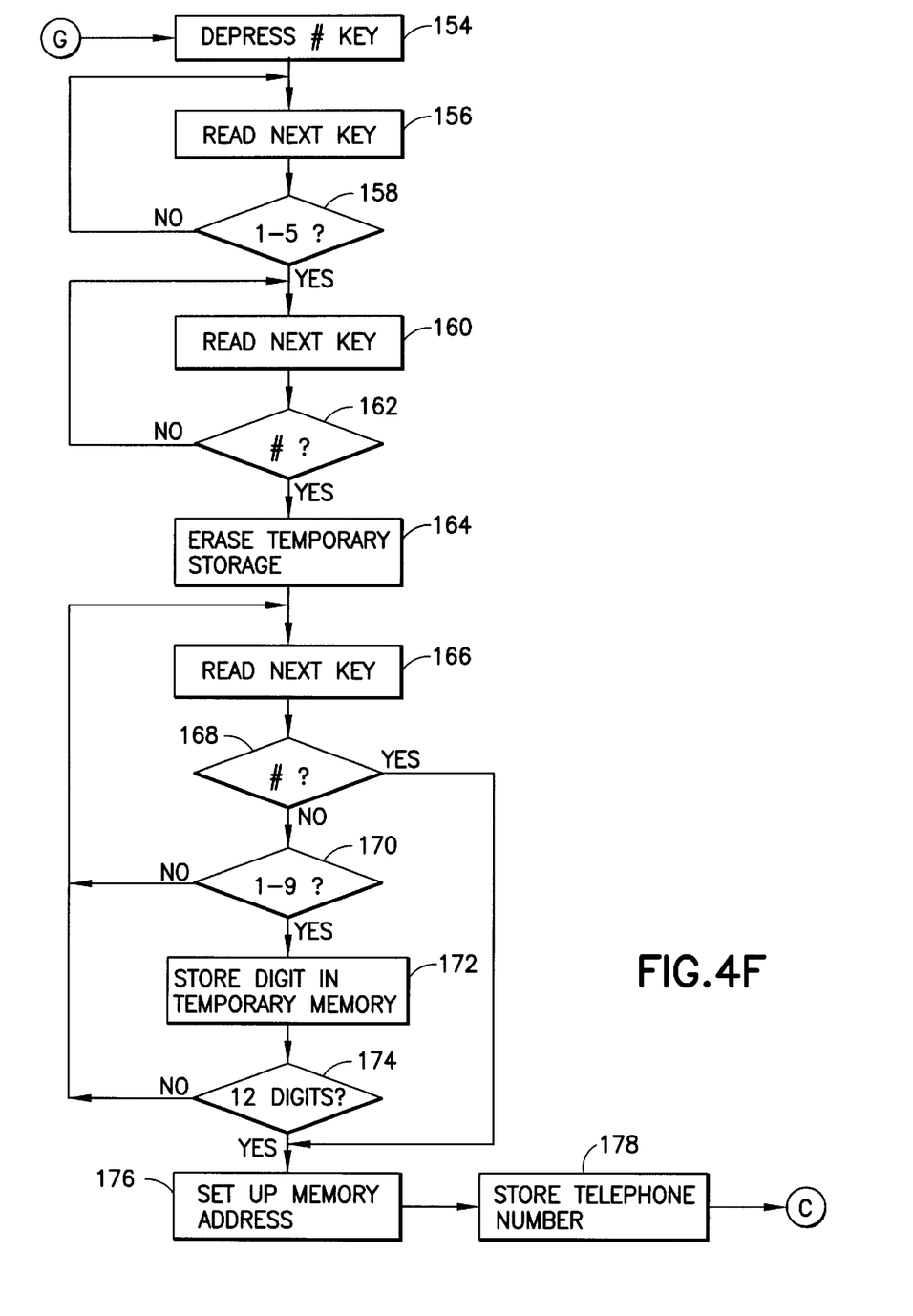

If yes, the user will then depress the pound key (#) in step 154 in FIG. 4F. The next key depressed by the user is read by microprocessor in step 156, and thereafter, it is determined if this depressed key is a numeric key 1–5 on telephone unit 14 in step 158. If no, the process returns to step 156. If yes, this is a designation of one of the five telephone numbers that are stored in memory 32 for later dialing during an emergency. In the next step 160, microprocessor 16 retrieves the next depressed key by the user, and then, in step 162, determines if this key is the pound (#) key. If not, the process returns to step 160 until the user presses the pound (#) key. If yes, any telephone number stored in a temporary storage area is erased during the next step 164. The next key that is depressed is then read in step 166, and in step 168, it is determined if this key is the pound (#) key. If not, it is determined if the depressed key is a numeric key 0–9 in step 170. If not, the process returns to step 166. If yes, however, the process continues to step 172 where the digit 0–9 corresponding to the depressed key is stored in a temporary memory buffer. In the next step 174, it is then determined if (for example eleven or twelve) the maximum number of digits has been read that can be stored for a telephone number has been read. If no, the process returns to step 166 to read the next depressed key.

The process for reading all of the digits for a particular telephone number ends either when the pound key(#) is depressed as the next key in step 166 and detected in step 168, or when twelve (12) digits, or however many digits the telephone system requires, have been read, as detected in step 174. Thereafter, an address in memory 32 is obtained for storing the digits of the telephone number (1–5) in step 176, and the digits for that telephone number are stored in memory 32 at that address in step 178. The process then returns to step 104 in FIG. 4A.

To delete a telephone number from memory 32, the first key that is depressed and read in step 166, before any digit is read, is the pound (#) key. This is detected in step 168. Since no digits have been entered, the telephone number corresponding to the location (1–5) is cleared and no new number is stored in place thereof, thereby effectively deleting the telephone number from memory 32.

The above operations describe the RECORD mode in which the emergency messages and telephone numbers are recorded or deleted.

For the CALL MODE, record/call switch 12 is set to the CALL MODE by toggle key REC/CALL on keypad 30, and this is sensed in step 110. In this mode, one of the three emergency calling dialing and message playing sequences is initiated by depressing one of the three emergency call keys E1, E2 or E3 either on emergency call unit 10 or on pendant 46. Thereafter, emergency call unit 10 will automatically dial the associated set of five telephone numbers, plus 911 if this is enabled. When dialing starts, a recognition signal, such as a tone or voice, is provided to the caller to acknowledge the operation of the system. After each telephone number is dialed, the associated emergency message is played, once or twice per user selection depending upon the position of jumper key J1/J2, followed by a standard message that provides further instructions to the called party. By depressing the appropriate key (7, 8 or 9, for example), the called party can either converse with the caller, acknowledge the emergency situation and shut down the emergency dialer, or repeat the emergency message. The middle operation will prevent other telephone numbers from being dialed, although this is optional. Alternatively, one or more other numbers can still be called once. If no response is obtained by the emergency call unit 10 within a prescribed time, for example, 10 seconds, the emergency dialer will hang up and try the next telephone number in the sequence.

Specifically, after the DIAL mode is sensed in step 110, the emergency key E1, E2 or E3 is read in step 180 (FIG. 4A) and it is determined if a valid key has been depressed. Specifically, the emergency key E1, E2 or E3 should be held down for approximately one-half second. To be a valid key depression, the emergency key must be held for a predetermined time period of, for example, 25–50 msec. in order to determine that there has not been an accidental flick or depression of the emergency key. In this regard, microprocessor 16 senses the emergency key held down and then waits for this predetermined time period of 25–50 msec. and checks again if the emergency key is still depressed. If not, it is determined to be an accidental flick of the emergency key, and thereby a false key whereby the process returns to step 106 in FIG. 4A. If the emergency key is still depressed after the second check, it is determined to be a valid depression of the emergency key, and the process continues to step 182 in which power is supplied to a latch circuit of the microprocessor 16.

Figures 4G, 4G:
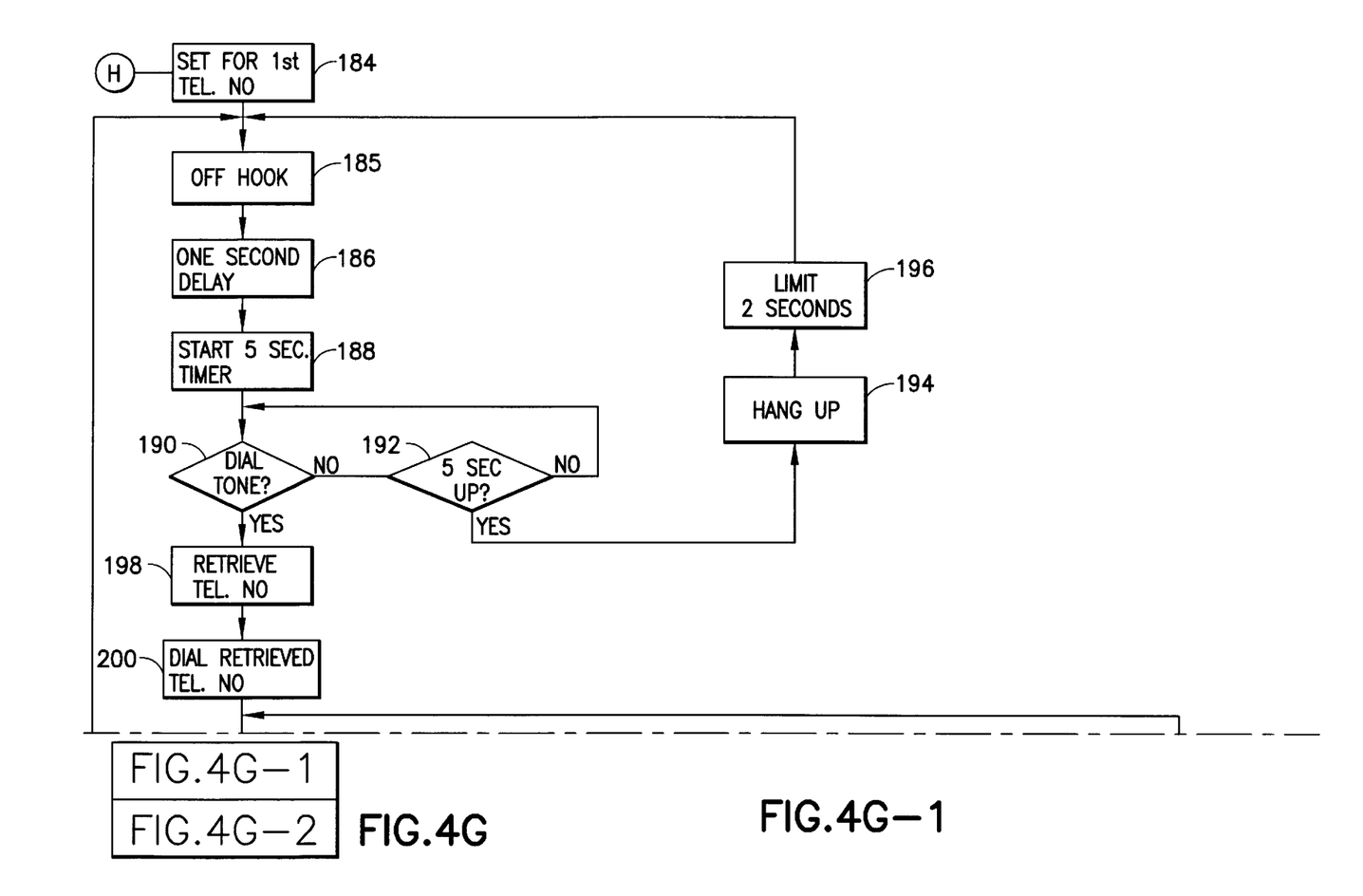
Figure 4G:
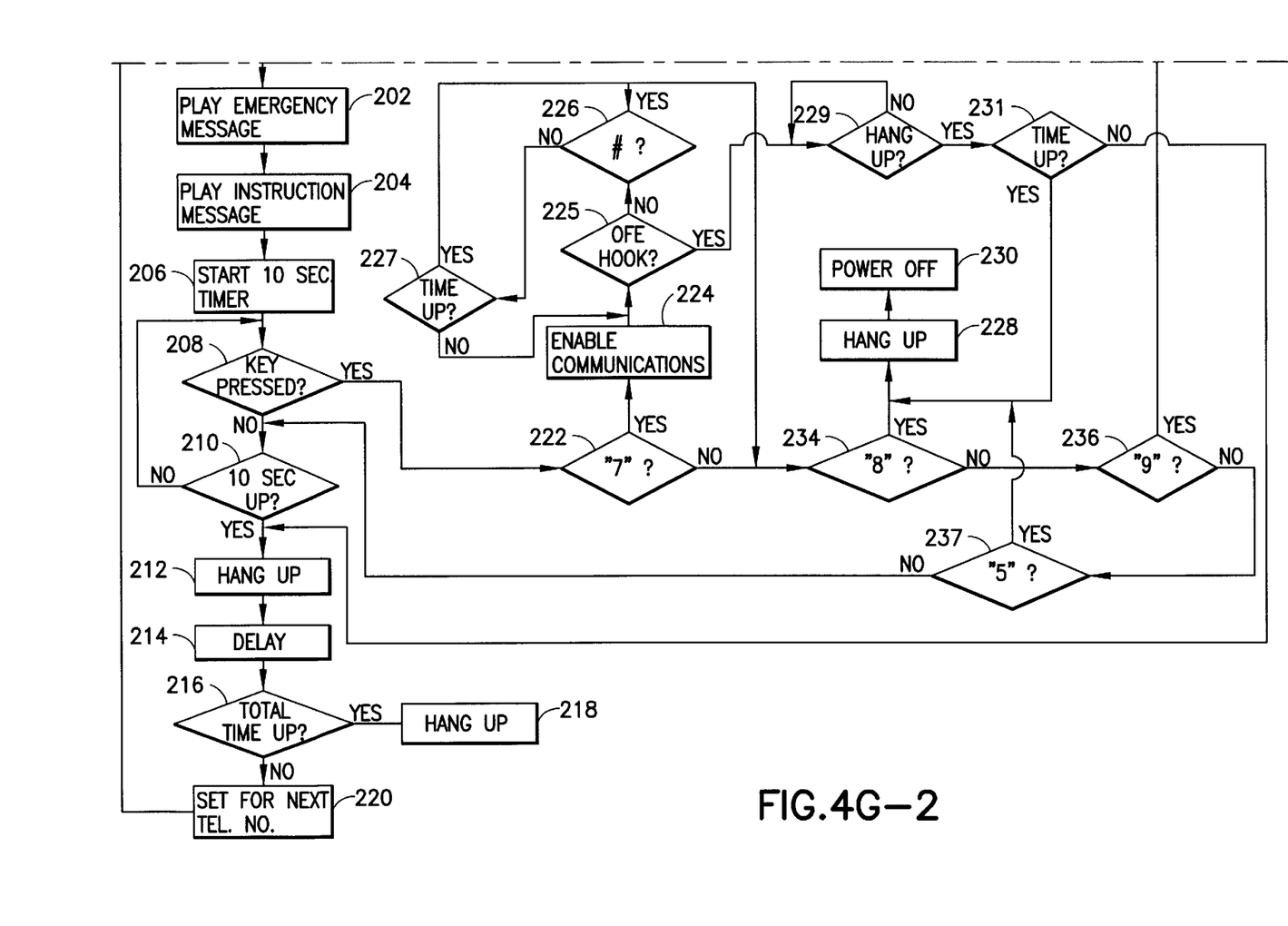

Thereafter, referring to FIG. 4G (which includes FIGS. 4G-1 and 4G-2), microprocessor is set in step 184 to retrieve the first telephone number to be dialed. Emergency call unit 10 provides an off hook condition in step 185 to obtain a dial tone. Then, there is a delay of one second in step 186, followed by the start of a five second timer in step 188. It is then determined if there is a dial tone in step 190. If not, it is determined in step 192 if the five second time period has expired. If not, the process returns to step 190. If yes, emergency call unit 10 hangs up in step 194, waits two seconds in step 196, and then returns to step 185.

If a dial tone is detected in step 190, the first telephone number to be dialed in association with the emergency key that has been depressed, is retrieved from memory 32 in step 198, and then, this telephone number is dialed in step 200.

Immediately thereafter, the appropriate pre-recorded emergency message from message storage unit 20 is read out in step 202, even while the telephone being dialed is still ringing. When a person picks up, the pre-recorded message may be in the middle of a message. Preferably, the pre-recorded message is played once for each telephone number, and this is determined by the jumper key J1/J2, so that the person picking up the telephone merely needs to continue listening to hear the message. In this manner, there is no delay from the time that the person answers the telephone. Generally, a message will start out with words such as "EMERGENCY, EMERGENCY", followed by the caller's pre-recorded message, so that the person picking up will not miss essential parts of the message.

The advantage of sending the message while the telephone is still ringing is that there is no need for any detection circuit to detect whether the called telephone is answered, thereby greatly simplifying the circuitry and rendering system 8 less costly.

However, it is also possible for system 8 to be set up so that the message is only played after a telephone is picked up or after an answering machine answers, and this would require such detection circuitry.

Following playback of the recorded emergency message, a second instruction message is played back in step 204, which instructs the called person as to various options that can be taken by depressing appropriate keys. A ten second timer is then started in step 206 to give the called person an opportunity to take any of the various actions. In step 208, it is determined if the called person has depressed a key on the called telephone unit. If no, it is determined if the ten second time period has expired in step 210. If no, the process returns to step 208. If yes, emergency call unit 10 hangs up in step 212, and waits for a delay time in step 214. It then determines in step 216 if a total time period, for example, one-half hour has elapsed. If yes, it hangs up in step 218. If no, it sets up microprocessor 16 to dial the next telephone number in step 220. Thereafter, the process returns to step 185. Alternatively, steps 216 and 218 can be eliminated, and the system can dial forever until someone disables the system.

If a remote key has been operated by the called person in step 208, it is first determined if the depressed key is the numeric key "7", in step 222. If yes, microprocessor 16 connects emergency call unit 10 for communication between the called person and the caller via speaker 26 and microphone 58, in step 224, for a predetermined limited time such as 90 seconds. For example, the called person can then assure the caller that help is on the way. The caller can then pick up the telephone and speak with the called person for as long as the caller desires. If this occurs, an off hook condition exists. It is therefore sensed in step 225 if an off hook condition exists in step 225. If no, the caller can end the communication but not the connection, by pressing the pound (#) key on keypad 30. This is determined in step 226. If the pound (#) key is pressed, the process continues to step 234 discussed hereinafter. If the pound (#) key is not pressed, it is next determined if the predetermined limited time has expired in step 227. If no, the process returns to step 225, and if yes, the process continues to step 234. Alternatively, instead of enabling communications, unit 10 can merely provide a signal such as an audible alarm or the like to the caller to indicate that the called person received the message.

In step 225, if the caller picks up the telephone, an off hook condition is detected, and the process continues to step 229, where it is determined if the caller has hung up the telephone. If no, a loop is provided back to the input of step 229 to periodically make this inquiry. If the person has hung up, the process continues to step 231 to determine if a predetermined time period of, for example, one-half hour has elapsed. This step is provided in the event that the caller cannot hang up the telephone that is picked up, and more than one-half hour passes when paramedics or others come to the aid of the caller and hang up the telephone. In such case, since the caller has been helped, the system should not start dialing the emergency telephone numbers again, since this would create a false emergency call. Thus, if the time has elapsed, the process continues to step 228 which is discussed hereinafter to end the call process. If the time has not elapsed, for example, the caller hangs up within the time period, the process continues to step 212, to start dialing other telephone numbers on the list.

In step 222, if it is determined that the numeric key "7" has not been depressed, it is then determined if the depressed key is the numeric key "8", in step 234. If yes, emergency call unit 10 hangs up in step 228, and then powers down the unit in 230 so that no further telephone numbers are dialed. This is because the message has been received by one person who can take action. Alternatively, rather than powering down, emergency call unit 10 can be programmed to dial the remaining numbers (or one or more further numbers) and leave messages. Preferably, if numeric key "8" is not depressed by any of the called numbers, emergency call unit 10 will continue to dial through all of the numbers more than one time, for example, two, three or more times until an appropriate response is received. The alternative operation limits this to dialing through the telephone numbers only once. Preferably, regardless of which alternative is used when numeric key "8" is depressed, a recognition signal, such as a tone or voice, will be sent to the caller to acknowledge that the message has been received.

In step 234, if it is determined that the numeric key "8" has not been depressed by the called person, it is determined in step 236 whether the numeric key "9" has been depressed. If yes, the process returns to step 202 in order for the played messages to be re-played for the called person.

If not, the process proceeds to step 237 where it is determined if the numeric key "5" has been depressed by the caller. If yes, the process returns to step 228 to shut the system down. If no, the process returns to step 210.

It is further noted that, at any time in the CALL MODE, if the caller picks up the telephone to talk to a called person or to call a person in a normal manner, the system is disabled since there is no dial tone in step 190, whereby emergency call unit 10 cannot dial any telephone number.

As discussed above, emergency call unit 10 and telephone unit 14 can be separate connected units, or alternatively, can be a single integral unit. Further, emergency call keys E1, E2 and E3 can be activated from the emergency call unit 10 or from pendant 46.

Thus, emergency call system according to the present invention eliminates the requirement for a central station, and eliminates the requirement for a separate wiring of the caller's home. Also, emergency call system can be used with a conventional telephone line. With such an arrangement, emergency call system is inexpensive and easy to make, install and operate.

Having described specific preferred embodiments of the invention with reference to the accompanying drawings, it will be appreciated that the present invention is not limited to the precise embodiments described, and that various changes and modifications can be effected by one of ordinary skill in the art without departing from the scope or spirit of the invention as defined by the appended claims.

What is claimed is:

1. An emergency call system by which a caller can automatically call a plurality of other parties to leave an emergency message, including an emergency call unit comprising:
    a memory for storing a plurality of telephone numbers to be called and at least one emergency message,
    an input/output device for connecting said emergency call unit to a telephone line,
    at least one emergency key, and
    a microprocessor connected with said memory, said at least one emergency key and said input/output device for:
        controlling storage of said plurality of telephone numbers to be called and said at least one emergency message in said memory,
        reading out said telephone numbers in sequence from said memory upon activation of at least one said emergency key,
        repeatedly attempting to obtain a dial tone from the telephone line,
        then, after the dial tone is obtained, dialing said read out telephone numbers in sequence,
        upon receiving an answer at one said dialed telephone number, supplying said at least one emergency message over said telephone line to said dialed telephone number to automatically advise of an emergency,
        dialing a next read out telephone number after said emergency message has been supplied to a previous answered telephone number,
        dialing a next read out telephone number after a previous dialed telephone number is not answered,
        upon receiving an answer at each next read out dialed telephone number, automatically sending an emergency message to each next read out dialed telephone number over said telephone line to automatically advise of an emergency, and
        repeating said steps of dialing a next read out telephone number and automatically sending an emergency message to each next read out dialed telephone number, until at least one of:
            all said read out telephone numbers have been dialed, regardless of whether one of said telephone numbers has been answered, and
            a predetermined time has elapsed.

2. An emergency call system according to claim 1, further comprising a plurality of numeric keys for keying in the plurality of telephone numbers to be called.

3. An emergency call system according to claim 2, wherein said input/output device is capable of connecting a telephone unit thereto, and said numeric keys are provided on said telephone unit.

4. An emergency call system according to claim 1, further comprising a plurality of recording keys connected with said microprocessor for controlling said microprocessor to store said plurality of telephone numbers to be called and said at least one emergency message.

5. An emergency call system according to claim 4, wherein said plurality of recording keys includes a record key for controlling said microprocessor to start recording an emergency message, a play key for controlling said microprocessor to playback a recorded message, and a store key for controlling said microprocessor to store a telephone number to be called.

6. An emergency call system according to claim 1, wherein said input/output device includes a record/call switch connected with said microprocessor for switching between a record mode in which the plurality of telephone numbers to be called and the at least one emergency message can be recorded and stored in said memory, and a call mode in which said telephone numbers can be read out in sequence from said memory and dialed, with said at least one emergency message being supplied over said telephone line to said dialed telephone numbers to automatically advise of an emergency.

7. An emergency call system according to claim 1, further comprising a decode device connected with said microprocessor for decoding keys activated by a called party.

8. An emergency call system according to claim 1, further comprising a speaker through which a called party can communicate to the caller.

9. An emergency call system according to claim 1,
    wherein said emergency call unit includes a receiver connected with said microprocessor, and
    further comprising a remote call unit having at least one emergency key and a transmitter for transmitting a signal to said microprocessor through said receiver when said at least one emergency key on said remote call unit is activated.

10. An emergency call system according to claim 1, wherein said microprocessor repeats said steps of dialing a next read out telephone number and automatically sending an emergency message to each next read out dialed telephone number, until one of:
    all said read out telephone numbers have been dialed at least once after depression of a predetermined button on a touch tone telephone of an answered telephone, and
    a predetermined time has elapsed.

11. An emergency call system according to claim 1, wherein said microprocessor repeats said steps of dialing a next read out telephone number and automatically sending an emergency message to each next read out dialed telephone number, until one of:
    all said read out telephone numbers have been dialed and answered in a case where there is no depression of a predetermined button on a touch tone telephone of an answered telephone, and
    a predetermined time has elapsed.

12. A method of alerting other parties of an emergency, comprising the steps of:
    activating an emergency key by a caller on one of an emergency call unit and a remote device;
    repeatedly attempting to obtain a dial tone from the telephone line;
    then, after the dial tone is obtained, automatically dialing a plurality of telephone numbers stored in said emergency call unit, one at a time, in sequence, upon activation of said emergency key;

upon receiving an answer at one said dialed telephone number, automatically sending an emergency message to said dialed telephone number over said telephone line to automatically advise of an emergency;

dialing a next read out telephone number after said emergency message has been supplied to a previous answered telephone number, and dialing a next read out telephone number after a previous dialed telephone number is not answered;

upon receiving an answer at each next read out dialed telephone number, automatically sending an emergency message to each next read out dialed telephone number over said telephone line to automatically advise of an emergency; and repeating said steps of dialing a next read out telephone number and automatically sending an emergency message to each next read out dialed telephone number, until at least one of:

all said read out telephone numbers have been dialed, regardless of whether one of said telephone numbers has been answered, and a predetermined time has elapsed.

13. A method according to claim 12, wherein said step of automatically sending an emergency message to each dialed telephone number, occurs regardless of whether there is an answer at the respective dialed telephone number.

14. A method according to claim 12, further comprising the step of enabling a called party corresponding to each dialed telephone number to disable said emergency call unit to prevent further telephone numbers from being dialed, by depressing a preset key on a keypad of a telephone of the called party.

15. A method according to claim 12, further comprising the step of enabling a called party corresponding to each dialed telephone number to communicate with said caller by depressing a preset key on a keypad of a telephone of the called party.

16. A method according to claim 12, further comprising the step of enabling a called party corresponding to each dialed telephone number to replay the emergency message by depressing a preset key on a keypad of a telephone of the called party.

17. A method according to claim 12, wherein said step of repeating continues until a predetermined response is acknowledged from a called telephone number.

18. A method according to claim 10, wherein said step of repeating said steps of dialing a next read out telephone number and automatically sending an emergency message to each next read out dialed telephone number, occurs until one of:

all said read out telephone numbers have been dialed at least once after depression of a predetermined button on a touch tone telephone of an answered telephone, and a predetermined time has elapsed.

19. A method according to claim 10, wherein said step of repeating said steps of dialing a next read out telephone number and automatically sending an emergency message to each next read out dialed telephone number, occurs until one of:

all said read out telephone numbers have been dialed and answered in a case where there is no depression of a predetermined button on a touch tone telephone of an answered telephone, and a predetermined time has elapsed.

* * * * *